(12) United States Patent
Adler et al.

(10) Patent No.: US 7,799,274 B2
(45) Date of Patent: Sep. 21, 2010

(54) DEVICE AND PROCESS FOR THE DEPOSITION OF ULTRAFINE PARTICLES FROM THE GAS PHASE

(75) Inventors: Peter Adler, Rheinfelden (DE); Wolfgang Pirzl, Kelkheim (DE); Raymund Sonnenschein, Frankfurt (DE)

(73) Assignee: Evonik Degussa GmbH, Essen (DE)

( * ) Notice: Subject to any disclaimer, the term of this patent is extended or adjusted under 35 U.S.C. 154(b) by 938 days.

(21) Appl. No.: 10/581,458

(22) PCT Filed: Oct. 13, 2004

(86) PCT No.: PCT/EP2004/052523

§ 371 (c)(1),
(2), (4) Date: Jun. 1, 2006

(87) PCT Pub. No.: WO2005/054130

PCT Pub. Date: Jun. 16, 2005

(65) Prior Publication Data

US 2007/0110619 A1 May 17, 2007

(30) Foreign Application Priority Data

Dec. 6, 2003 (DE) .................................. 103 57 091

(51) Int. Cl.
*G01N 31/12* (2006.01)
*B01J 10/00* (2006.01)
*B01J 10/02* (2006.01)
*B01J 12/00* (2006.01)
*B01J 12/02* (2006.01)
*B01J 14/00* (2006.01)
*B01J 15/00* (2006.01)
*B01J 16/00* (2006.01)
*B01J 19/00* (2006.01)
*F27B 15/08* (2006.01)

(52) U.S. Cl. .................... 422/78; 422/129; 422/145

(58) Field of Classification Search .............. 423/349; 427/213; 422/78, 129
See application file for complete search history.

(56) References Cited

U.S. PATENT DOCUMENTS 2,488,406 A * 11/1949 Hirsch ..................... 518/709

(Continued)

OTHER PUBLICATIONS

U.S. Appl. No. 11/575,226, filed Mar. 14, 2007, Sonnenschein et al.

(Continued)

*Primary Examiner*—Jill Warden
*Assistant Examiner*—Bryant T Kilpatrick
(74) *Attorney, Agent, or Firm*—Oblon, Spivak, McClelland, Maier & Neustadt, L.L.P.

(57) ABSTRACT

A device for the thermal decomposition of a volatile compound, and for deposition of particles which are formed by the decomposition, includes (a) a pressure vessel, (b) at least one reaction tube located inside the pressure vessel such that, an open end of the reaction tube extends into the pressure vessel and an other end of the reaction tube is located outside the pressure vessel and is provided with a gas feed, wherein a longitudinal axis of the reaction tube is oriented in the direction of gravity and parallel to a longitudinal axis of the pressure vessel and wherein the reaction tube can be heated on a gas inlet side and cooled on a gas outlet side, wherein the pressure vessel, in its lower part, comprises a collection cone, wherein the open end of the at least one reaction tube extends into a gas space of the collection cone, wherein the collection cone is connected to an outlet lock for particles, and (c) a gas outlet unit located mainly inside the pressure vessel, the gas outlet unit comprising a gas guide, a gas inlet region, wherein the gas inlet region is in communication with the gas space of the collection cone, a filter system, and a gas outlet, which is located outside the pressure vessel.

20 Claims, 1 Drawing Sheet

U.S. PATENT DOCUMENTS

Figure 1:
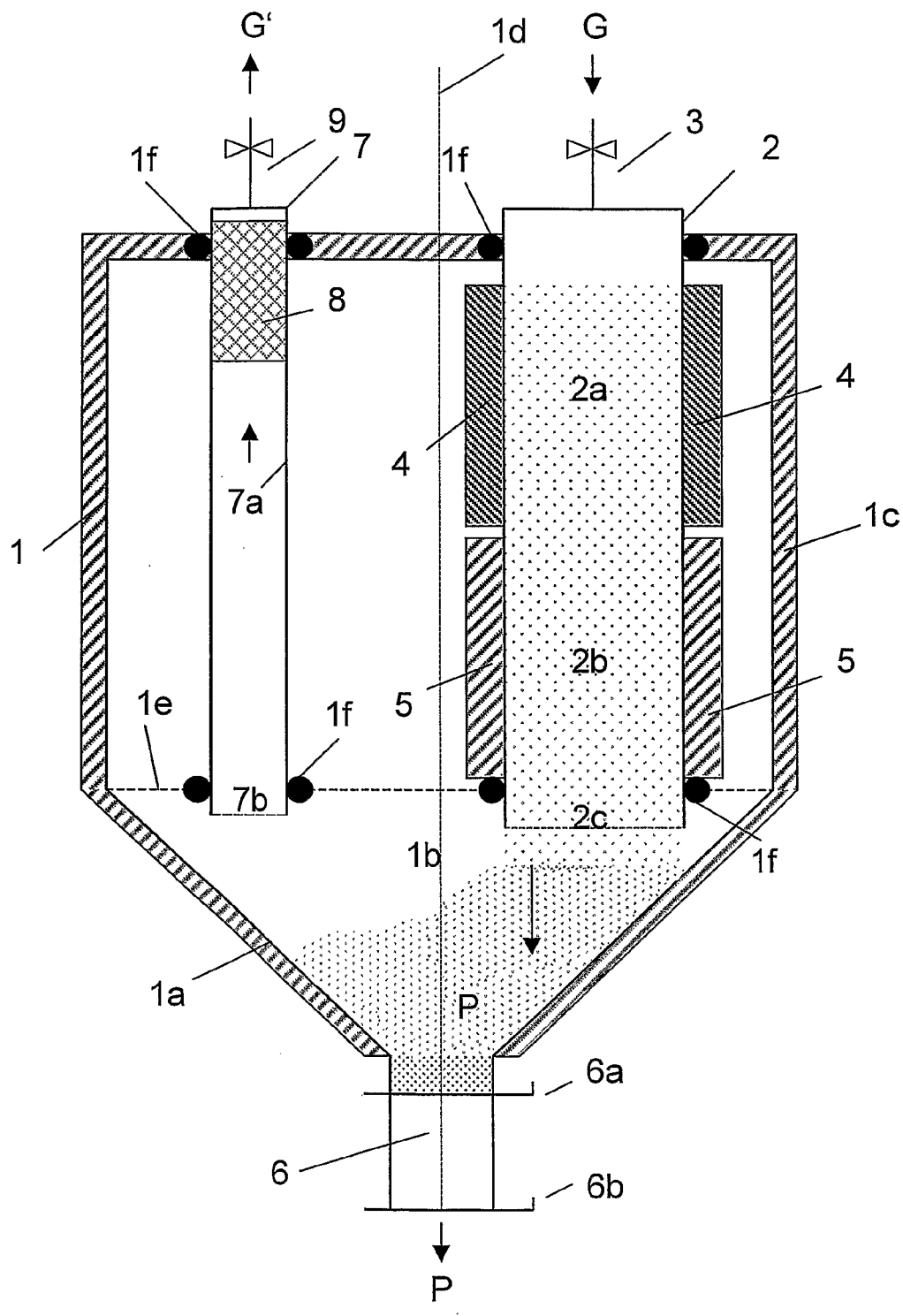

| | | | |
|---|---|---|---|
| 3,012,861 A * | 12/1961 | Ling | 423/349 |
| 4,444,811 A | 4/1984 | Hsu et al. | |
| 4,642,227 A | 2/1987 | Flagan et al. | |
| 4,684,513 A | 8/1987 | Iya | |
| 4,818,495 A * | 4/1989 | Iya | 422/145 |
| 5,421,843 A * | 6/1995 | Teague et al. | 96/228 |
| 5,866,721 A | 2/1999 | Hofen et al. | |
| 6,423,859 B1 | 7/2002 | Alig et al. | |
| 2004/0091630 A1 | 5/2004 | Sonnenschein | |
| 2005/0014922 A1 | 1/2005 | Muller et al. | |
| 2005/0192460 A1 | 9/2005 | Pascaly et al. | |
| 2007/0110619 A1 | 5/2007 | Adler et al. | |
| 2007/0166456 A1 | 7/2007 | Kuehnle et al. | |
| 2007/0251447 A1 | 11/2007 | Muller et al. | |

OTHER PUBLICATIONS

U.S. Appl. No. 11/569,774, filed May 10, 2005, Sonnenschein et al.
U.S. Appl. No. 11/569,783, filed May 10, 2005, Sonnenschein et al.
U.S. Appl. No. 12/097,645, filed Jun. 16, 2008, Sonnenschein et al.
U.S. Appl. No. 10/586,675, filed Jul. 20, 2006, Mueh et al.
Wiggers H et al., "Silicon Particle Formation By Pyrolysis of Silane in a Hot Wall Gasphase Reactor", Chemical Engineering and Technology, Weinheim, DE, XP009042555, vol. 24, pp. 261-264, 2001.
U.S. Appl. No. 10/587,399, filed Jul. 27, 2006, Poepken et al.

* cited by examiner

DEVICE AND PROCESS FOR THE DEPOSITION OF ULTRAFINE PARTICLES FROM THE GAS PHASE

The invention relates to a device (also referred to below as apparatus, reactor or pyrolysis reactor) and a process for the deposition of ultrafine particles from the gas phase, in particular of pulverulent silicon for photovoltaic and electronic applications.

It has long been known to produce high-purity silicon by gas phase pyrolysis of monosilane (cf. inter alia U.S. Pat. No. 4,676,967, DE 33 11 650, DE 752 280, DE 11 80 346). A problem which all these processes have in common is that of producing ultrafine particles as efficiently as possible and then separating them from a gas and collecting them. The process has recently been developed further at the University of Duisburg (Wiggers, Starke, Roth: "Silicon Particle Formation by Pyrolysis of Silane in a Hot wall Gasphase Reactor", Chem. Eng. Technol. 24 (2001) 3, pages 261 to 264).

Starting from monosilane, pulverulent silicon is produced in accordance with the following general reaction equation $$SiH_4 \rightarrow Si + 2H_2$$

The installations which are suitable for this process are generally constructed as follows: the pyrolysis reactor comprises a vertically arranged tube, optionally made from SiSiC or quartz glass. It can be heated in the upper half and is installed inside a cooled special steel casing. To prevent caking on the wall of the tube, this region is purged with hydrogen from above. The monosilane is injected, in pure form or diluted with a suitable gas, from above and is decomposed in the hot zone. The particles which are formed are agglomerated further down the tube and are cooled together with the hydrogen formed from the reaction and the hydrogen used for purging. The silicon and the hydrogen leave the tube in the lower region. Then, 100% nitrogen is blown in order to cool the hydrogen/solids mixture and to allow the solids to be conveyed pneumatically with greater success. The silicon is in this way passed through a pipeline into a dust filter, where it is collected and separated from the hydrogen by metal filter candles which can be cleaned pneumatically. The hydrogen leaves the filter and is generally passed to an off-gas incineration stage. The silicon is collected in a trapping vessel and discharged.

A drawback of an arrangement of this type is the conveying of the silicon dust, at the outlet of the reactor tube, through a line which is oriented substantially horizontally or upward. This often leads to the pipe becoming blocked. A further drawback is the cooling by a quench, since a further gas has to be added here. Furthermore, the capacity of a single tube is limited and therefore the outlay on apparatus entailed by the need for parallel individual installations is considerable. Furthermore, blockages occurred again and again at the discharge from the filter casing. A further drawback is the fact that the silicon which is formed is contaminated by abrasion of the special steel.

It was an object of the invention to provide a possible way of alleviating the abovementioned drawbacks.

According to the invention, the object is achieved in accordance with the features of the patent claims. Therefore, the following advantageous construction has been discovered.

The novel pyrolysis reactor comprises one or more reaction tubes, for example five tubes which can be heated independently of one another and are installed in a preferably cooled pressure vessel. The collection cone for product is arranged below the outlet side of the substantially vertically oriented reaction tubes, i.e. the pressure vessel is designed in such a way that its lower part serves simultaneously to trap and collect particles which are formed during the decomposition reaction, with the collection cone advantageously also being connected at its lowest point to an outlet lock for powder, i.e. product. If monosilane is used to produce silicon, the reaction tubes preferably consist of SiSiC or quartz glass. Of course, for other products other materials, for example metallic materials, are also suitable. The length and diameter of the tubes generally depend on the desired production capacity, on the target product and the gas to be used and on the diluting gas. In this context, it is preferable to use reaction tubes with a length of from 0.6 to 7 m and a diameter of optionally 30 to 400 mm. The upper part of all the tubes is equipped with one or more heating zones, preferably between 2 and 6. It is preferable to use an electrical resistance heating means, with the result that the reaction tubes, i.e. the decomposition region in the reaction tubes, can be heated in a suitable way to a temperature which is above the decomposition temperature of the substrate, preferably from 800 to 1100° C. The maximum temperature which can be reached in the tubes is 1000° C. for quartz glass, 1100° C. at the tube walls. In particular the provision of five reaction tubes increases the capacity of an apparatus according to the invention considerably while, at the same time, making cost-effective use of the reactor jacket and the peripherals, such as for example the control and safety technology required by gas handling regulations. The lower half of a reaction tube serves as an agglomeration and coalescence zone, with the solids/gas mixture simultaneously being cooled in a suitable way to below 100° C., for example by means of water cooling of a double jacket. There is therefore no need for foreign gas to be fed into a quench. The gas/solids mixture which has been cooled in this way leaves the individual reaction tubes, and the product, which is generally free-flowing (and is also referred to below as particles, solids or powder), drops down into the collection cone. There is therefore no need for any conveying elements, and consequently contamination and costs are reduced in a simple and economic way. The solids may in this case, by way of example, advantageously be discharged downward, via a double-flap system, into a gastight and inertable container or melting furnace or other further processing stages.

A pneumatic discharge aid can be installed in the region of the cone as an additional fluidizing aid and at set intervals of time discharges the solids, by means of a stream of hydrogen, for example into a fixedly docked container or melting furnace, if this does not occur through gravimetry. The container or the inlet side for a melting furnace may be equipped with an entry flap, which is open together with the exit flap of the reactor (6a) during the filling operation or is alternately operated as a double gate. The hydrogen leaves the pyrolysis reactor at the top in a suitable way via the integrated, centrally arranged filter or gas outlet unit.

This filter which is integrated in the reactor according to the invention preferably has one or more filter candles made from sintered metal, ceramic, fibers or plastic, of which in each case one or more simultaneously can be backwashed and thereby cleaned by a blast of gas pressure from a gas tank once a certain pressure difference is reached. The cleaning may optionally be operated with an inert gas, such as for example argon or advantageously the gas from the decomposition reaction, such as for example hydrogen. The gas or gas mixture leaves the filter and can be fed, for example, to an off-gas treatment stage.

All the surfaces which come into contact with product are advantageously made from or coated with a material which cannot contaminate the product. If the product is silicon, for example, it is advantageously possible to use ceramic or plastics, such as polyethylene (PE), ethylene tetrafluoroethylene (ETFE), polytetrafluoroethylene (PTFE), or silicon. This, together with the filter handles, avoids metallic contamination of the silicon.

The different thermal expansion of tubes and jacket is preferably taken into account in the present invention by virtue of the fact that they can expand freely upward, which can be achieved, for example, simply by providing a suitable seal between tube and connection piece. Furthermore, the reaction tubes are advantageously held by water-cooled steel flanges in the steel jacket of the pressure vessel.

FIG. 1 uses a sketch to illustrate a preferred embodiment of the present invention.

The subject matter of the present invention is a device (also referred to below as apparatus, reactor or pyrolysis reactor) for the thermal decomposition of volatile compounds (also referred to below as substrate for short) and deposition of particles which are then formed, which includes at least the following characteristic features a pressure vessel (1),
at least one reaction tube (2), the open end (2c) of which extends into the pressure vessel and the other end of which is located outside the pressure vessel and is provided with a gas feed (3) so that its open end (2c) projects into a product collection cone (1b), the longitudinal axis of the reaction tube is oriented in the direction of gravity and parallel to the longitudinal axis of the pressure vessel (1d), and the reaction tube can be heated (2a) on the gas inlet side and cooled (2b) on the gas outlet side,
the pressure vessel (1), in its lower part, has a collection cone (1a), the open end of the reaction tube(s) (2c) extending into the gas space of the collection cone (1b),
the collection cone (1a) is connected to an outlet lock (6) for particles (P), and
a gas outlet unit (7), which is equipped with a gas guide (7a), the gas inlet region (7b) of which is in communication with the gas space (1b) of the collection cone (1a), a filter system (8) and a gas outlet (9), which is located outside the pressure vessel.

In the device according to the invention, it is preferable for the outer walls of the pressure vessel (1) to be coolable (1c), for example by a double jacket using water as coolant.

Furthermore, the device according to the invention may be equipped with at least one tube plate (1e), which suitably encloses and stabilizes the reaction tubes (2) which are present on the outlet side, and also the filter tube (7). The filter tube (7) and the reaction tubes (2) are advantageously sealed by O-rings (1f) with respect to the reactor (1) and the tube plate (1e), cf. FIG. 1.

A reaction tube (2) of a device according to the invention preferably has a length of from 60 to 700 cm, particularly preferably 100 to 600 cm, and a diameter of from 30 to 400 mm, particularly preferably 50 to 200 mm.

In devices according to the invention, the reaction tubes (2) appropriately consist of metal, silicon nitride, silicon carbide, SiSiC, i.e. Si-infiltrated silicon carbide, or quartz glass.

In devices according to the invention, the reaction tubes (2) are preferably each sheathed by an electrical resistance heating means (4) on the gas inlet side, in which case a reaction tube (2) can expediently be heated over 30 to 70%, particularly preferably over 40 to 60%, of its length.

Furthermore, the reaction tubes (2) are surrounded by a cooling unit (5) toward their open side (2b).

Furthermore, devices according to the invention are expediently equipped with 2 to 36, preferably 3 to 18, particularly preferably 4 to 6, in particular 5, reaction tubes (2).

When designing the angle of inclination of the collection cone (1a) with respect to the axis of the pressure vessel (1), it is expedient to take into account the angle of repose of the product. For example, the angle between the wall of the collection cone (1a) and axis of the pressure vessel (1d) is preferably between 70° and 20°, particularly preferably between 45° and 15°.

Furthermore, devices according to the invention have an outlet lock (6) with a double-flap system (6a, 6b), with the result that the product can be discharged in a simple and economic manner which is also gentle on the product and can in this way be provided for further processing.

The gas mixture G' which is produced in the decomposition reaction in accordance with G→P+G', cf. also FIG. 1, may, in devices according to the invention, preferably be discharged via a filter system (8) having one or more filter candles, which expediently consist of sintered metal, ceramic, fibers or plastic.

In devices according to the invention, the reaction tubes (2) and the gas outlet unit (7) are preferably connected to the pressure vessel (1) by means of water-cooled steel flanges.

The subject matter of the present invention is also a process for the thermal decomposition of at least one volatile compound and deposition of particles which are then formed, using a device according to the invention, in which the corresponding reaction tubes (2) are heated on the inlet side (2a) to the decomposition temperature of the volatile compound, and the lower region (2b) of the reaction tubes is cooled,
the volatile, thermally decomposable compound, for example an element selected from the group consisting of Si, Ge, C, N, Fe, Ti, Zr, Al, Ga or mixtures thereof, is if appropriate diluted with a gas which is substantially inert in this context, preferably argon or hydrogen, and this gas or gas mixture (G) is fed to the reaction tubes (2) via the corresponding gas feed (3),
the particles (P) which are formed during the decomposition and have gathered in the collection cone (1a) are discharged via the lock unit (6), and
the gas or gas mixture (G') which is formed during the decomposition reaction (also referred to below as decomposition gas for short) is discharged via the gas outlet (9), with the pressure in the pressure vessel (1) being kept substantially constant.

In this process, it is expedient for preferably the inlet-side part of the reaction tubes (2a) to be heated to a temperature from 800 to 1100° C., particularly preferably from 900 to 1000° C., and for the lower part of the reaction tubes (2b, 2c) to be cooled to a temperature of $\leq 100°$ C., preferably 10 to 60° C.

In particular, in processes according to the invention monosilane is fed to the pyrolysis reactor in undiluted form (G) or diluted with hydrogen (G). Therefore, processes according to the invention advantageously produce high-purity silicon powder (P), with the product (P) preferably being discharged from the collection cone (5) in batches via a double-flap system (6a, 6b) of the outlet lock (6).

Furthermore, the process according to the invention can advantageously also be used to produce other ultrafine particles by pyrolytic decomposition of volatile compounds, for example silicon nitride from $SiH_4$ and $NH_3$ or $SiO_2$ from $SiCl_4$, $H_2$ and air.

The invention claimed is:

1. A device for a thermal decomposition of a volatile compound, and deposition of particles which are formed by said decomposition, comprising:
   (a) a pressure vessel,
   (b) at least one reaction tube located inside said pressure vessel such that,
       an open end of said reaction tube extends into the pressure vessel and
       an other end of said reaction tube is located outside the pressure vessel and is provided with a gas feed, wherein a longitudinal axis of the reaction tube is oriented in the direction of gravity and parallel to a longitudinal axis of the pressure vessel, wherein the reaction tube can be heated on a gas inlet side and cooled on a gas outlet side, wherein the pressure vessel, in its lower part, comprises a collection cone, wherein the open end of the at least one reaction tube extends into a gas space of the collection cone, wherein the collection cone is connected to an outlet lock for particles, and (c) a gas outlet unit located mainly inside said pressure vessel, said gas outlet unit comprising
a gas guide,
a gas inlet region,
wherein the gas inlet region is in communication with the gas space of the collection cone,
a filter system, and
a gas outlet, which is located outside the pressure vessel; and wherein said gas outlet unit has a longitudinal axis which is oriented in the direction of gravity and parallel to said longitudinal axis of said pressure vessel; and wherein said reaction tube and said gas outlet unit are located on opposite sides of said longitudinal axis of said pressure vessel.

2. The device as claimed in claim 1, wherein the outer walls of the pressure vessel are coolable.

3. The device as claimed in claim 1, wherein the at least one reaction tube has a length of from 60 to 700 cm.

4. The device as claimed in claim 1, wherein the at least one reaction tube has a diameter of from 30 to 400 mm.

5. The device as claimed in claim 1, wherein the at least one reaction tube comprises a material selected from the group consisting of metal, silicon nitride, silicon carbide, Si-infiltrated silicon carbide, and quartz glass.

6. The device as claimed in claim 1, wherein the at least one reaction tube is sheathed by an electrical resistance heating means on the gas inlet side.

7. The device as claimed in claim 1, wherein the at least one reaction tube is surrounded by a cooling unit toward its open side.

8. The device as claimed in claim 1, wherein the at least one reaction tube can be heated over 30 to 70% of its length.

9. The device as claimed in claim 1, which comprises from 2 to 36 reaction tubes.

10. The device as claimed in claim 1, wherein the outlet lock comprises a double-flap system.

11. The device as claimed in claim 1, wherein the filter system comprises one or more filter candles.

12. The device as claimed in claim 11, wherein the one or more filter candles comprise a material selected from the group consisting of sintered metal, ceramic, fibers and plastic.

13. The device as claimed in claim 1, wherein the at least one reaction tube and the gas outlet unit are connected to the pressure vessel by water-cooled steel flanges.

14. A process for a thermal decomposition of at least one volatile, thermally decomposable compound and deposition of particles formed by said decomposition, using the device as claimed in claim 1, said process comprising:

heating the at least one reaction tube, on the inlet side, to a temperature greater than or equal to the decomposition temperature of the volatile, thermally decomposable compound, cooling the lower region of the at least one reaction tube, optionally, diluting the volatile, thermally decomposable compound with a gas or gas mixture, feeding the volatile, thermally decomposable compound into the at least one reaction tube, via the corresponding gas feed, decomposing the volatile, thermally decomposable compound to form the particles and at least one gas, gathering the particles in the collection cone, and discharging the gathered particles via the outlet lock unit for the particles, wherein the at least one gas formed during the decomposition reaction is discharged via the gas outlet, with the pressure in the pressure vessel being kept substantially constant.

15. The process as claimed in claim 14, wherein the inlet side of the at least one reactor is heated to a temperature which is above the decomposition temperature of a substrate.

16. The process as claimed in claim 14, wherein the lower region of the at least one reaction tube is cooled to a temperature of $\leqq 100°$ C.

17. The process as claimed in claim 14, wherein monosilane, undiluted, is fed to the at least one reaction tube.

18. The process as claimed in claim 17, wherein the particles are a high-purity silicon powder, and wherein the particles are discharged from the collection cone in batches via the outlet lock.

19. The process of claim 15, wherein the volatile thermally decomposable compound is $SiH_4$, and wherein the temperature is from 800 to 1100° C.

20. The process of claim 14, comprising diluting the volatile, thermally decomposable compound with a gas or gas mixture, wherein the gas or gas mixture comprises hydrogen.

* * * * *